US007165069B1

(12) United States Patent
Kahle et al.

(10) Patent No.: US 7,165,069 B1
(45) Date of Patent: Jan. 16, 2007

(54) ANALYSIS OF SEARCH ACTIVITIES OF USERS TO IDENTIFY RELATED NETWORK SITES

(75) Inventors: Brewster Kahle, San Francisco, CA (US); Paul van der Merwe Sauer, San Francisco, CA (US)

(73) Assignee: Alexa Internet, San Francisco, CA (US)

( * ) Notice: Subject to any disclaimer, the term of this patent is extended or adjusted under 35 U.S.C. 154(b) by 0 days.

(21) Appl. No.: 09/345,611

(22) Filed: Jun. 28, 1999

(51) Int. Cl.
*G06F 17/30* (2006.01)

(52) U.S. Cl. ...................................................... 707/10
(58) Field of Classification Search .............. 707/1–10, 707/100–104.1, 200–206; 715/501.1, 512, 715/530; 709/200
See application file for complete search history.

(56) References Cited

U.S. PATENT DOCUMENTS

| 5,895,470 | A | 4/1999 | Pirolli et al. |
| 6,112,202 | A | 8/2000 | Kleinberg |
| 6,112,203 | A | 8/2000 | Bharat et al. |
| 6,282,548 | B1 | 8/2001 | Burner et al. |
| 6,418,433 | B1 | 7/2002 | Chakrabarti et al. |
| 6,691,163 | B1 | 2/2004 | Tufts |
| 6,772,139 | B1 * | 8/2004 | Smith, III ........................ 707/3 |
| 6,877,137 | B1 * | 4/2005 | Rivette et al. .............. 715/512 |
| 2002/0019827 | A1 * | 2/2002 | Shiman et al. .............. 707/200 |
| 2002/0083065 | A1 * | 6/2002 | Sasaki et al. ................ 707/100 |
| 2004/0205508 | A1 * | 10/2004 | Wecker et al. ............ 715/501.1 |
| 2005/0065774 | A1 * | 3/2005 | Doganata et al. .............. 704/7 |
| 2005/0066331 | A1 * | 3/2005 | Inoue et al. ................ 718/104 |
| 2005/0149584 | A1 * | 7/2005 | Bourbonnais et al. ...... 707/204 |

OTHER PUBLICATIONS

Peter Zoller et al., WEBCON: a toolkt for an automatic, data dictionary based on connection of databases to the WWW, 1998, ACM Press, NY, NY, pp. 706-711.*

(Continued)

*Primary Examiner*—Diane Mizrahi

(57) ABSTRACT

A meta-data generator is described for generating meta-data relating to at least one Web site, the meta-data identifying, for a Web site providing at least one Web page, identification of, for other Web sites, at least one Web page associated therewith having a selected relationship with the at least one Web site. The meta-data generator includes an information accumulation module, a meta-data generation module and a meta-data storage module. The information accumulation module accumulates Web page information associated with respective Web sites. The meta-data generation module uses the accumulated Web page information according to a selected meta-data generation methodology to generate said meta-data, and the meta-data storage module stores the meta-data generated by the meta-data generation module. Several meta-data generation methodologies are described, including a link (Web page identifier) analysis methodology, two Web page usage analysis methodologies; and a search results analysis methodology. In the link analysis methodology, meta-data is generated associated with Web pages based on the proximity of links to Web pages in each of a plurality of Web pages. In the Web page usage analysis methodologies, the meta-data generator 25 generates meta-data based on the sequence of Web sites which operators enable their computers to request Web pages during a session. In the search results analysis methodology, the meta-data generator generates meta-data based on activities of an operator after he or she receives results generated by a search engine in response to a search query.

16 Claims, 12 Drawing Sheets

OTHER PUBLICATIONS

John R. Nicol, *How the Internet helps build collaborative multimedia applications*, Jan. 1999, ACM Press, NY, NY, vol. 42, No. 1, pp. 79-85.*

O. Zaiane, M. Xin and J. Han. *Discovering Web Access Patterns and Trends by Applying OLAP and Data Mining Technology on Web Logs*, Proceedings of the Advances in Digital Libraries Conference, pp. 19-29, Apr. 1998 (published by IEEE Computer Society).

T. Pedersen. *Dependent Bigram Identification*, In Proc. 15$^{th}$ National Conf. on Artificial Intelligence, Jul. 1998 (American Assoc. for Artificial Intelligence).

D. Beckett. *Combined Log System*, Computer Networks and ISDN Systems 27, In Proc. 3$^{rd}$ Int'l Conf. World-Wide Web Conference, pp. 1089-1096, Apr. 1995.

A. Wexelblat and P. Maes. *Footprints: History-Rich Tools for Information Foraging*, Proceedings of CHI '99 Conference, ACM Press 1990.

M. Roscheisen, C. Mogensen and T. Winograd. *Beyond browsing: shared comments, SOAPs, trails, and on-line communities*, Computer Networks and ISDN System 27, In Proc. 3$^{rd}$ Int'l World-Wide Web Conference, pp. 739-749, Apr. 1995.

J. Dean and M. Henzinger, *Finding related pages in the World Wide Web*, Compaq Systems Research Center, pp. 389-401, Mar. 1999 (published by Elsevier Science).

\* cited by examiner

ANALYSIS OF SEARCH ACTIVITIES OF USERS TO IDENTIFY RELATED NETWORK SITES

FIELD OF THE INVENTION

The invention relates generally to the field of digital networks such as the Internet and World Wide Web, and the like, and more particularly to systems and methods for generating meta-data regarding Web pages which are accessible and can be downloaded thereover.

BACKGROUND OF THE INVENTION

The World Wide Web, together with other resources available over the Internet, provide a mechanism by which users, using computers or other information access devices, can obtain large amounts of information about a wide variety of subjects from a large number of information providers. Generally, information provided by information providers is in the form of "Web pages," generally in HTML (HyperText mark-up language) format, which is a text-based format that describes how the respective Web page is to be displayed by the user's computer, and provides textual information, typically in ASCII form, and graphical information generally in a compressed format such as "GIF" or "JPEG." In addition, a Web page will typically have HyperText-like "links" identifying other Web pages which may be provided by the same provider or other information providers which may be of interest to someone viewing the particular Web page.

Typically, links to other Web pages which may be contained in a particular Web page will be relatively limited, most notably to those links which the provider of the one Web page knows about when the one Web page is originally generated or updated, and will likely not be an exhaustive and updated set of Web pages which may be available over the World Wide Web which may be related thereto. U.S. Pat. No. 6,282,548 to Burner et al., assigned to the assignee of the present application and incorporated herein by reference, describes a system for augmenting a Web page with meta-data including information as to other Web sites which may provide Web pages containing further information which he or she may find of interest in connection with the Web page he or she is currently viewing. In the system described in the Burner application, after a computer user has enabled his or her computer's Web browser to download a Web page for display in its (that is, the browser's) window on the computer's video display, client software also executed on the computer enables the computer to access a Web site, operating as a meta-data server, which maintains meta-data for a number of Web sites, to determine whether the Web site from which the Web page is being downloaded is associated with meta-data. If the meta-data server has meta-data for that Web site, it will download the meta-data to the computer, which the client software can enable to be displayed in its window on the computer's video display. Typically, the meta-data may include, for example, identification of other Web sites and/or Web pages which the user may wish to visit for other information related to the Web page being downloaded. As displayed in the client software's window, the Web site and page identifications are in the form of links, which a user can, by clicking thereon, enable the browser to initiate a download.

SUMMARY OF THE INVENTION

The invention provides a new and improved system and method for generating meta-data concerning Web pages which can be downloaded over the World Wide Web.

In brief summary, the invention provides a meta-data generator for generating meta-data relating to at least one Web site, the meta-data identifying, for a Web site providing at least one Web page, identification of, for other Web sites, at least one Web page associated therewith having a selected relationship with the at least one Web site. The meta-data generator includes an information accumulation module, a meta-data generation module and a meta-data storage module. The information accumulation module accumulates Web page information associated with respective Web sites. The meta-data generation module uses the accumulated Web page information according to a selected meta-data generation methodology to generate said meta-data, and the meta-data storage module stores the meta-data generated by the meta-data generation module.

Another aspect of the invention provides several specific meta-data generation methodologies, including a link (Web page identifier) analysis methodology, two Web page usage analysis methodologies; and a search results analysis methodology. In the link analysis methodology, meta-data is generated associated with Web pages based on the proximity of links to Web pages in each of a plurality of Web pages. In the Web page usage analysis methodologies, the meta-data generator 25 generates meta-data based on the sequence of Web sites which operators enable their computers to request Web pages during a session. In the search results analysis methodology, the meta-data generator generates meta-data based on activities of an operator after he or she receives results generated by a search engine in response to a search query.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
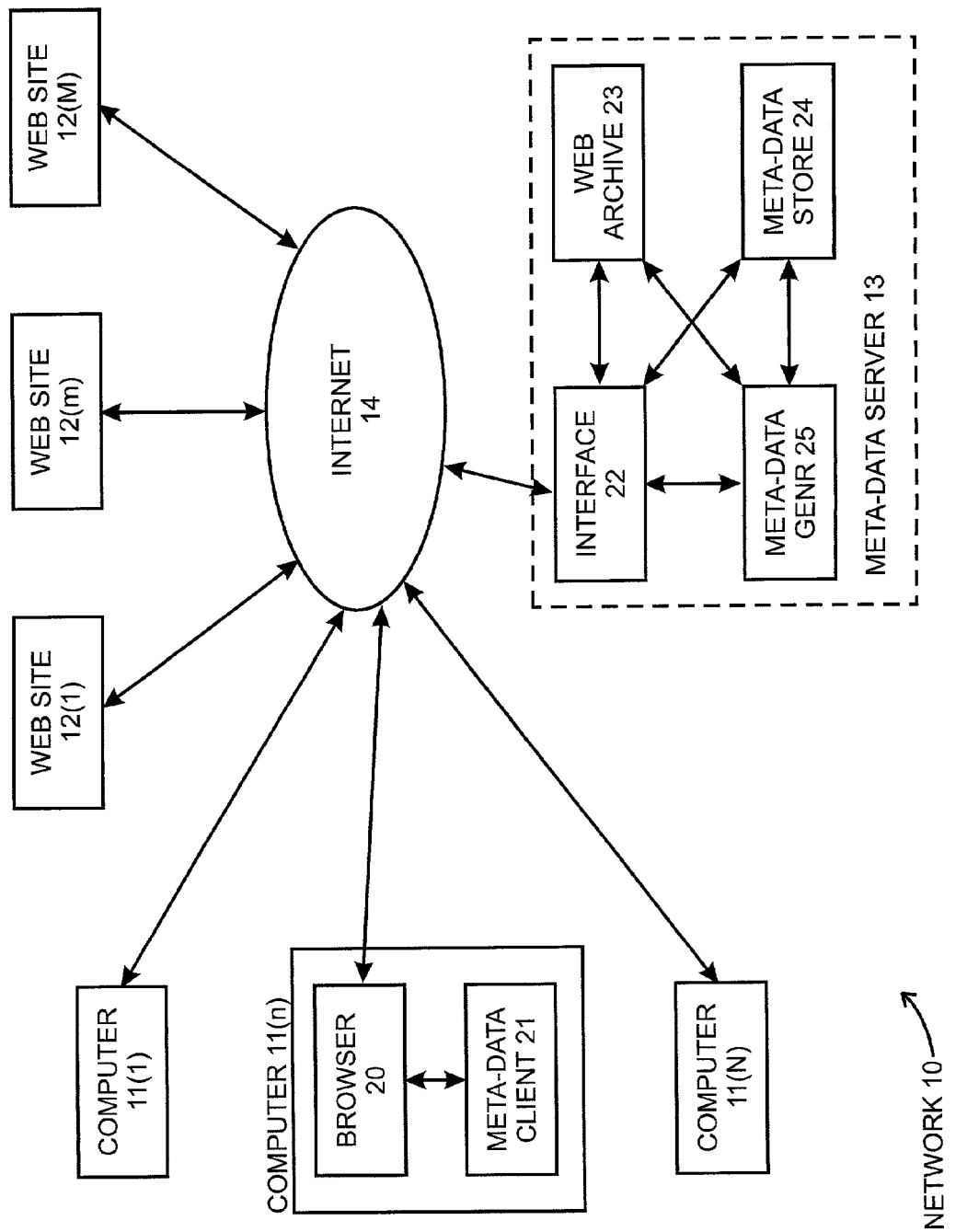
FIG. 1 is a functional block diagram of a computer network including a meta-data generator constructed in accordance with the invention.

FIG. 1 is a functional block diagram of a computer network 10 including a meta-data generator constructed in accordance with the invention. With reference to FIG. 1, the network 10 includes a plurality of computers 11(1) through 11(N) (generally identified by reference numeral 11(n)), a plurality of Web sites 12(1) through 12(M) (generally identified by reference numeral 12(m)) and a meta-data server 13, all of which communicate over a communication medium, which in one embodiment comprises the Internet 14. The computers 11(n) may be, for example, personal computers, computer workstations or the like, including processing, information storage, video display, operator input devices, hardcopy output, modem and/or network interface devices and other hardware and software components (not separately shown) that conventionally comprise and are used in connection with such computers. The Web sites 12(m) maintain Web pages, which the computers 11(n) may request be downloaded to them for display to their respective operators. The Internet 14 transfers Web page download requests from the various computers 11(n) to the respective Web sites 12(m) on which the respective Web pages are located. In addition, the Internet 14 transfers the requested Web pages from the respective Web sites 12(m) to the respective computers 11(n). After a computer 11(n) receives at least some portion of a requested Web page from the Internet, it can begin displaying the Web page in a window on its video display device.

The meta-data server 13 stores meta-data that is associated with at least some of the Web pages which are maintained on the Web sites 12(m). In one embodiment, as described in the aforementioned Burner patent, meta-data includes such information as, for each Web page, identification of other Web sites (more specifically, home Web pages for such Web sites) that may be a source of Web pages that a person viewing the particular Web page may deem of interest to retrieve, but it will be appreciated that other types of information may be included instead or in addition. When a computer 11(n) transmits a request for a particular Web page over the Internet 14, it can also transmit a request to the meta-data server 13 over the Internet inquiring as to whether the meta-data server 13 has meta-data for that particular Web page, and, if so, to enable it (that is, meta-data server 13) to transfer the meta-data to it (that is, the computer 11(n)) over the Internet. If the computer 11(n) receives meta-data from the meta-data server 13, it (that is, the computer 11(n)) can use the meta-data in connection with a display in a window therefor on its video display device.

As noted above, the computer 11(n) generates Web page requests and meta-data requests for transmission over the Internet 14, and displays Web pages and meta-data in respective windows therefor. As shown in FIG. 1, the computer 11(n) includes a browser 20 and a meta-data client 21 for performing these operations. Generally, the browser 20 includes software programming for controlling the computer hardware to receive requests for Web pages from the computer's operator, and transmit in response Web page requests over the Internet to the respective Web sites 12(m) on which the respective Web pages are maintained. In addition, the browser 20 receives Web pages from the Internet and displays them to the operator in its window on the video display unit. The browser 20 also provides Web page identification information to the meta-data client 21. The meta-data client 21, in turn, can use the identification information to generate meta-data requests for transmission over the Internet 14 to the meta-data server 13. In addition, the meta-data client 21 can receive the meta-data and display a window through which the meta-data can be accessed by the operator.

Furthermore, if the operator accesses and clicks on meta-data which identifies another Web site or Web page, the meta-data client 21 can present a request for a Web page to the browser 20. The browser 20 will handle the request in substantially the same manner in which it handles requests received from the operator, that is, transmit a request for the Web page over the Internet 14, receive the Web page from the Internet and display it on the video display unit, and provide the Web page identification to the meta-data client 21. The meta-data client 21 will also handle those identifications in the same manner as in connection with identifications that it receives in response to requests received from the operator. That is, the meta-data client 21 will transmit a request for meta-data associated with the newly requested Web page to the meta-data server 13, and if it receives meta-data in response, allow the meta-data to be accessed by the operator through its window. Thus, the meta-data client 21 helps an operator to sequence through a series of Web pages and Web sites which contain generally related information, or to evolving information based on a differences which may exist in the set of Web page identifications associated with the series of Web pages.

As noted above, the meta-data server 13 provides meta-data in response to requests therefor from the meta-data clients 21 in the various computers 11(n). The meta-data server 13 includes an interface 22, a Web archive 23, a meta-data store 24 and, in accordance with the invention, a meta-data generator. 25. The meta-data store 24 stores meta-data which has been generated for respective Web pages. The interface 22 receives requests for meta-data which have been generated by the various computers 11(n) from the Internet 14 and, for each request determines whether the meta-data store 24 is storing any meta-data for the Web page identified in the request. If so, the interface 22 can retrieve the meta-data from the meta-data store 24 for transfer to the respective computer. If the interface 22 determines that there is no meta-data associated with a Web page for which meta-data has been requested, it can so notify the computer 11(n) requesting the meta-data, in which case the computer can so notify the operator if he or she wishes to access meta-data through the meta-data client's window.

In addition, the interface 22 operates to retrieve Web pages over the Internet 14 for analysis for purposes of generating meta-data for storage in the meta-data store 24 and use in connection with requests from the various computers 11(n). The Web pages that are retrieved can be stored in the Web archive 23 and analyzed by the meta-data generator 25. The meta-data generator 25, in accordance with the invention, generates the meta-data based on its analysis using one or more of several diverse methodologies. In addition to analysis of Web pages, the meta-data generator 25 also generates meta-data based on other criteria, including the series of Web pages that a particular operator requests during a session, Web pages that a search engine suggests are related, or a combination of these factors and possibly other factors. After generating meta-data for a Web page, the meta-data generator 25 can store the meta-data in the meta-data store 24 for access by the interface 22 in connection with responses to requests for meta-data that the interface 22 receives from the computers 11(n).

As noted above, the meta-data generator 25 generates meta-data using one or more of a plurality of meta-data generation methodologies, and, if multiple meta-data generation methodologies are used in connection with one or more of the Web pages, to combine the meta-data generation using the individual methodologies. In one embodiment, the meta-data generator 25 makes use of one or more of the following individual methodologies in the generation of meta-data:

(i) a link (Web page identifier) analysis methodology;
(ii) two Web page usage analysis methodologies; and
(iii) a search results analysis methodology.

Each of these methodologies will be described in detail below. Briefly, in the link analysis methodology (item (i) above), the meta-data generator 25 generates meta-data associated with Web sites based on the proximity of Hyper-Text links to Web pages on the respective Web sites in each of a plurality of Web pages. In the Web page usage analysis methodology (item (ii) above), the meta-data generator 25 generates meta-data based on the sequence of Web sites 12($m'$), 12($m''$), . . . from which operators enable their computers to request Web pages during a session. In the search results analysis methodology (item (iii) above), the meta-data generator generates meta-data based on activities of an operator after he or she receives results generated by a search engine in response to a search query.

Generally, the link analysis methodology reflects the expectation that links, or Web page identifiers for other Web pages, that Web page authors and designers provide in the Web pages that they are designing, will generally cluster the Web page identifiers relating to a particular subject matter on the Web page. Thus, the meta-data generator 25 can determine that the Web pages identified by Web page identifiers that are relatively close to one another on a Web page are more likely to be associated with the same subject matter, whereas Web pages identified by Web page identifiers that are relatively far apart on a Web page are less like likely to be associated with the same subject matter. On some Web pages, Web page identifiers are listed in an order indicative, for example, of an index, in which textual items associated with the respective Web page identifiers are listed in, for example, approximate alphabetical order by subject matter category, subcategory and the like, in which case the proximity of the Web page identifiers listed on the Web page will not necessarily indicate that they are associated with the same subject matter.

On the other hand, the Web page usage methodology reflects the expectation that other Web pages that one or more operators request during a session, or at least some portion of a session, will be generally related, on the assumption that the operator(s) will be searching for information relating to a particular, but possibly of broad scope, topic during the session or portion thereof. The search results analysis methodology reflects the expectation, if a person receives a search result from a search engine in response to a search request related to a specific search topic, and thereafter sequences to a Web site identified in the search results and remains there for a while, it is likely that the Web pages on the Web site will be related to the search topic. In that case, if a number of other operators perform the same operations in connection with the same search topic, the Web sites that the operators utilize can be considered to relate to the same subject matter, in particular the subject matter related to the search topic. As indicated above, the meta-data generator 25 can also combine the various meta-data generated for a particular Web page using the various methodologies into a single meta-data which can be provided by the meta-data server 13 in response to a request therefor from a computer 11($n$).

It will be appreciated that, by having the meta-data specify the Web site, or more specifically the top level or other selected web page maintained by and available from the Web site, instead of other Web pages that may be available on the Web site, the likelihood can be reduced that the meta-data will become stale, that is, refer to a Web site that no longer exists, even though a link to a particular Web page may become stale, that is, refer to a Web page that no longer exists. It will be apparent, however, that meta-data can refer to or include individual Web pages other than or in addition to Web site's top level or selected pages.

Operations performed in connection with each of these methodologies will be described in more detail in connection with FIGS. 2 through 4, with operations performed in connection with the link analysis methodology being described in connection with FIG. 2, operations performed in connection with the Web page usage analysis methodology being described in connection with FIG. 3 and operations performed in connection with the search results analysis methodology being described in connection with FIG. 4.

As noted above, in the link analysis methodology, the meta-data generator 25 essentially determines the degree, if any, to which Web sites are related based on the proximity of links associated with those Web sites to one another on a respective Web page, after examining a number of Web pages. The Web archive stores Web pages for analysis by the meta-data generator 25 in connection with the link analysis methodology. Briefly in connection with the link analysis methodology, the meta-data generator 25 determines that one Web site 12($m'$), which is associated with a link on a Web page, is related to other Web sites 12($m''$), 12($m'''$), . . . which are associated with links that are relatively proximate to the link associated with the one Web site 12($m'$), on a sufficiently large number of Web pages. If a Web page has a series of links associated with respective Web sites 12($m_1$), 12($m_2$), . . . , 12($m_V$) (generally identified by reference numeral 12($m_v$)), which, in turn, are associated with a respective series of Web site identifiers "12($m_1$)," "12($m_2$)," . . . , "12($m_V$)" (generally identified by "12($m_v$)"), the meta-data generator 25 generates, for the Web site identifier "12($m_v$)" associated with each link, a set of tuples ["12($m_v$)", "12($m_{v-w}$)"], . . . , ["12($m_v$)", "12($m_{v-1}$)"], ["12($m_v$)", "12($m_{v+1}$)"], . . . , ["12($m_v$)","12($m_{v+w}$)"], where each Web site identifier "12($m_{v-w}$)", . . . , "12($m_{v-1}$)", "12($m_{v+1}$)", . . . , "12($m_{v+w}$)" is associated with a link in a window "w" (w$\geq$0) around the link associated with Web site identifier "12($m_v$)." It will be appreciated that, for some links at the beginning and end of a Web page the meta-data generator 25 will not generate one or more of tuples ["12($m_v$)", "12($m_{v-w}$)"], . . . , ["12($m_v$)", "12($m_{v-1}$)"], for links at the beginning of a Web page, or ["12($m_v$)", "12($m_{v+1}$)"], . . . , ["12($m_v$)", "12($m_{v+w}$)"], for links at the end of a Web page. The meta-data generator 25 will generate a corresponding set of tuples for each Web site identifier "12($m_v$)" on a Web page, for each of the Web pages in the Web archive 23.

After the meta-data generator 25 has generated tuples for the Web pages that it has available in the Web archive 23, it sorts the tuples using the first Web site identifier as the primary sort key, and the second Web site identifier as the secondary sort key, to obtain a sorted list. For each of the first Web site identifiers in the respective tuples, the meta-data generator 25 identifies those Web sites for which the second identifier is mentioned most frequently, and selects a predetermined number of such Web sites. Those selected Web sites comprise the set of related Web sites for the respective Web site whose identifier is the first Web site identifier in the tuple. Preferably, for a Web site, each of the other Web sites deemed "related" thereto will be identified as the second Web site identifier in a predetermined minimum number of tuples for which the particular Web site is identified as the first Web site identifier.

Figure 2A:
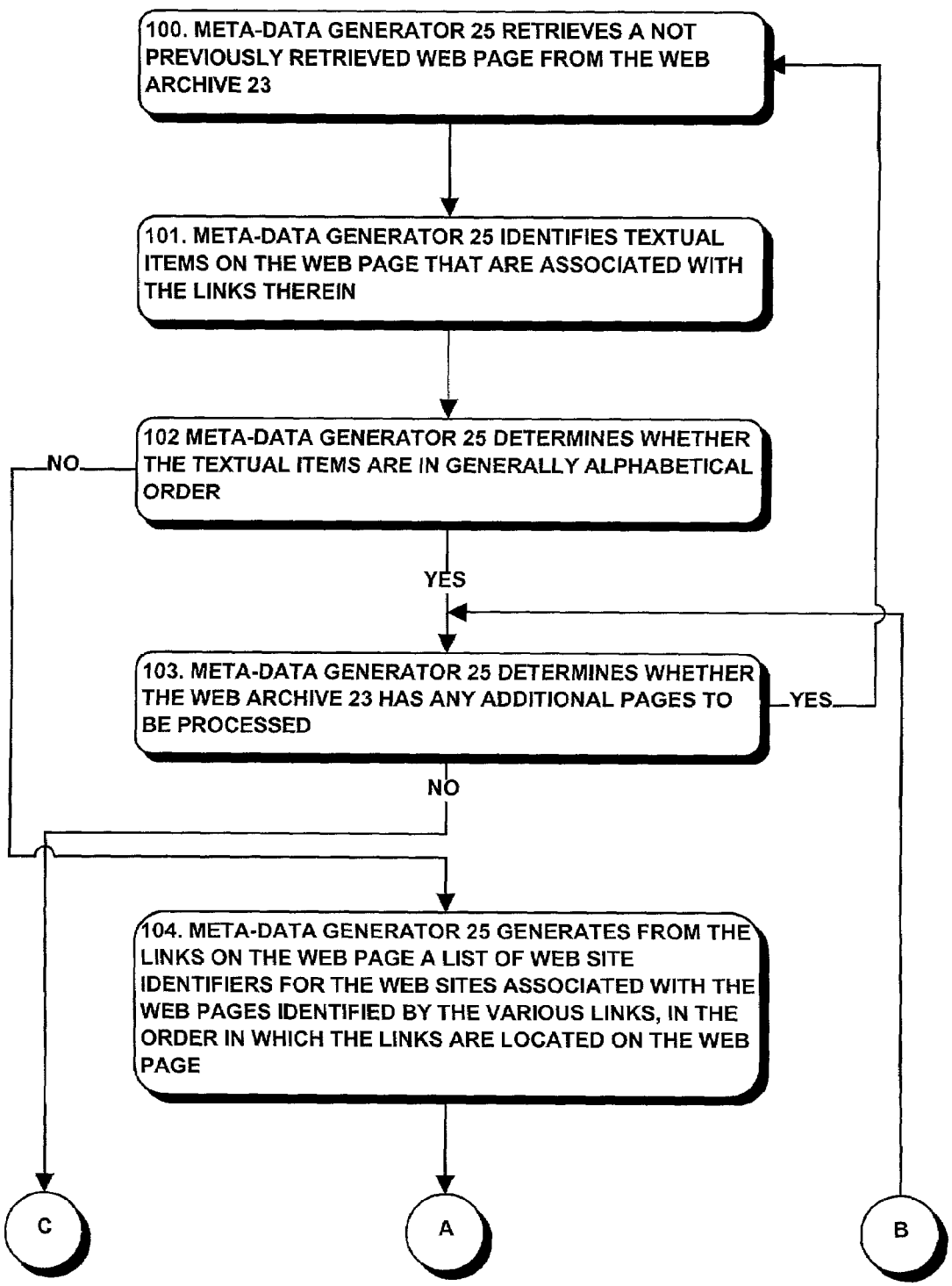
FIGS. 2 through 5 are flowcharts depicting operations performed by the meta-data generator in connection with respective meta-data generation methodologies in connection with the invention.
Figure 2B:
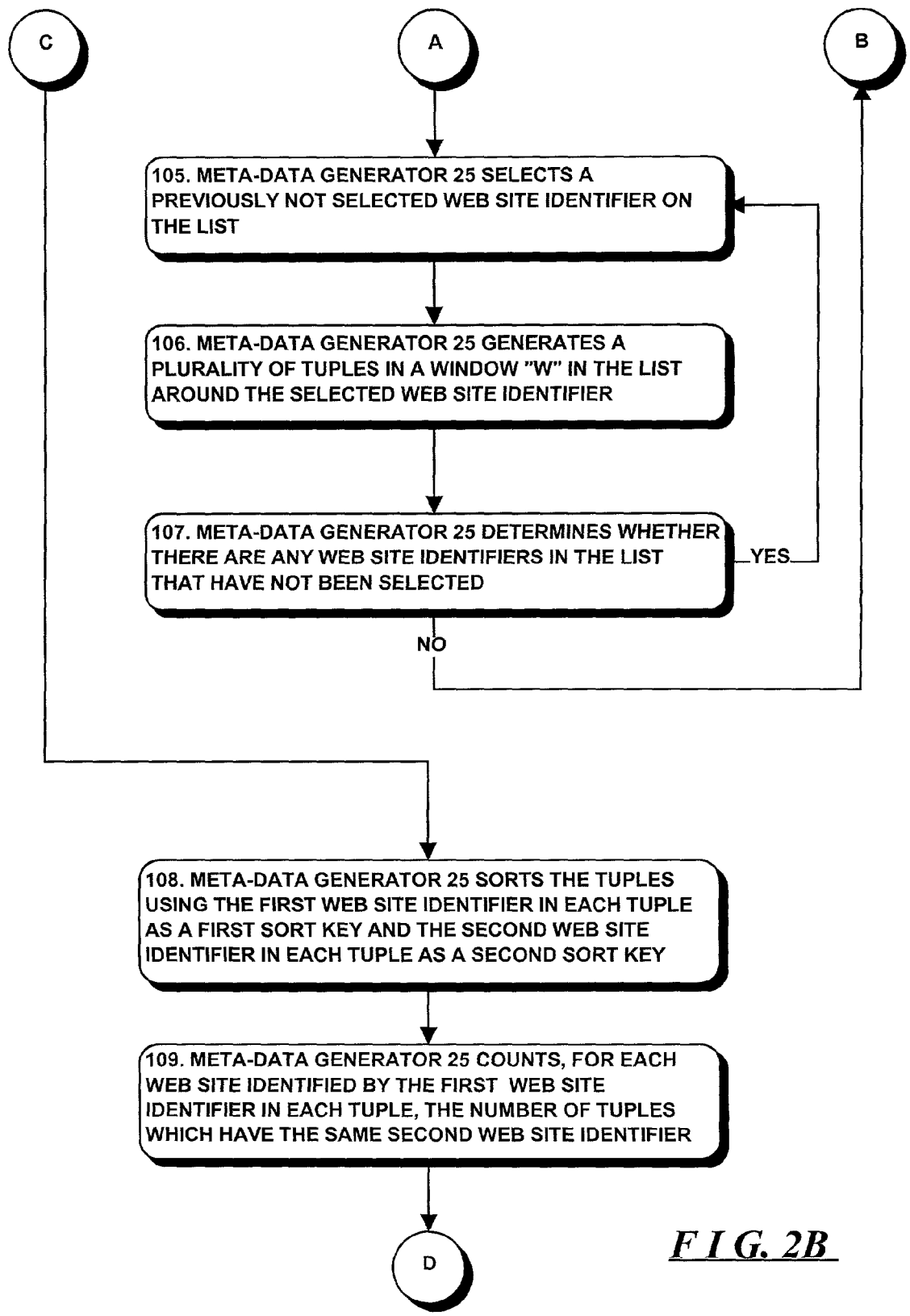
Figure 2C:
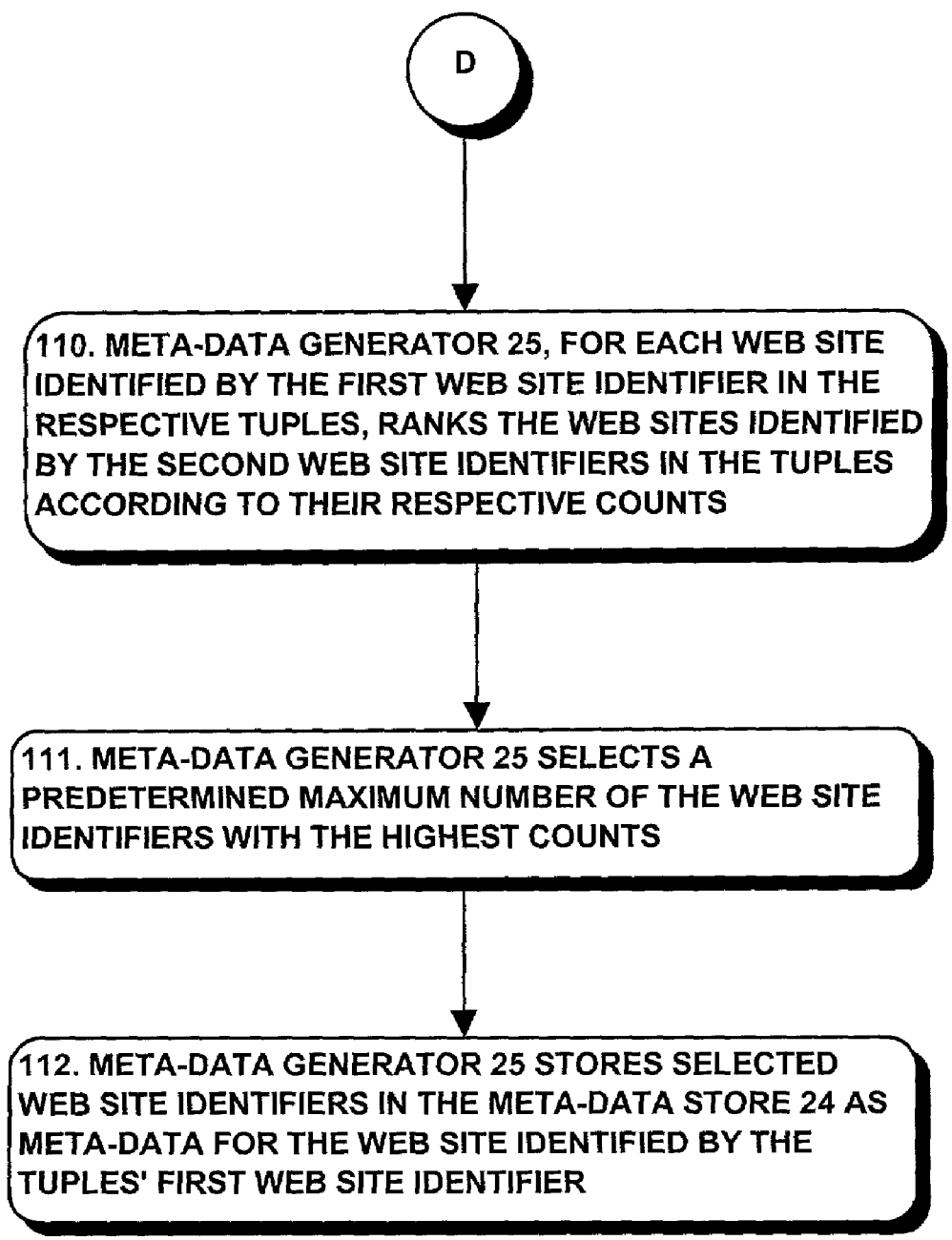

More specifically, and with reference to FIG. 2, the meta-data generator 25 processes Web pages in a plurality of iterations, in each iteration performing a number of operations to determine the proximity of links associated with Web sites in the respective Web pages. Initially, the meta-data generator 25 retrieves a Web page from the Web archive 23, which web page has not been previously retrieved (step 100), and identifies textual items associated with the Web page identifiers therein (step 101) and determines whether the textual items are in generally alphabetical order (step 102). If the textual items associated with the various links on the Web page are in generally alphabetical order, the proximity of the links associated therewith does not necessarily indicate any relationship between the subject matter associated with the respective links, and so the meta-data generator 25 will preferably ignore that Web page. Accordingly, if the meta-data generator 25 makes a positive determination in step 102, that is, if it determines that the textual items associated with the various links are in alphabetical order, it will determine whether the Web archive 23 has any additional pages to be processed (step 103), and, if so, returns to step 100 to select the next Web page in the Web archive 23.

On the other hand, if the meta-data generator 25 makes a negative determination in step 102, which will occur if it determines that the textual items associated with the various links on the Web page are not in alphabetical order, it will determine, from the links on the Web page, a list of Web site identifiers "12($m_1$)", "12($m_2$)", . . . "12($m_V$)" for the Web sites associated with the Web pages identified by the various links, in the order in which the links are located on the Web page (step 104). Each Web site identifier on the list will be associated with an index "i."

Thereafter meta-data generator 25, in each of a plurality of iterations, selects one of the Web site identifiers 12($m'$), 12($m''$), . . . on the list, which has not been previously selected (step 105) and generates therefor a respective set of tuples each with the identifiers for the selected Web site and another Web site identified in the window around the selected Web site identifier. It will be appreciated that, in the first iteration, the meta-data generator 25 will preferably select the first Web site identifier on the list (that is, index "i" equals "one"), and in each subsequent iteration select the next Web site identifier on the list. In each iteration, after selecting a Web site identifier in step 105, the meta-data generator 25 generates a plurality of tuples (step 106). In particular, the meta-data generator 25 generates tuples ["12($m_{iS}$)", "12($m'_{iS}$)"], where the first Web site identifier "12($m_{iS}$)" corresponds to the selected Web site identifier, and, as the second Web site identifier "12($m'_{iS}$)" one of the other Web site identifiers in a window "w" (w≧0) in the list around the selected Web site identifier. The window consists of the Web site identifiers on the list for which indices extend from the index "$i_S$−w" to index "$i_S$−1", preceding the Web site identifier identified by index "$i_S$" which contains the selected Web site identifier "12($m_{iS}$)," and from index "$i_S$+1" through index "$i_S$+w" in the list following the selected Web site identifier "12($m_{iS}$)." It will be appreciated that, if no Web site identifier exists for a particular one of indices $i_S$−w through $i_S$−1 and $i_S$+1 through $i_S$+w, then no tuple will be created therefor. This can occur, for example, for indices is having values from "one" to "w−1," for which there will be no Web site identifiers associated with one or more of the indices "$i_S$−w" through "$i_S$−1" for the second Web site identifiers (that is, for which one or more of indices "$i_S$−w" through "$i_S$−1" will be less than "one"). Similarly, this can occur for indices is for the selected Web site identifier having values from "I−w+1" through "I" (where "I" is the number of Web site identifiers in the list), for which there will be no Web site identifiers associated with one or more of the indices "$i_S$+1" through "$i_S$+w" for the second Web site identifiers (that is, for which one or more of indices "$i_S$+1" through $i_S$+w" will be greater than "I"). For each tuple ["12($m_{iS}$)", "12($m'_{iS}$)"] so generated, the meta-data generator 25 also generates a complementary tuple ["12($m'_{iS}$)", "12($m_{iS}$)"].

After generating tuples for the respective selected Web site identifier, associated with index "$i_S$", the meta-data generator 25 determines whether there are any Web site identifiers in the list that have not been selected (step 107). If the meta-data generator 25 makes a positive determination in step 107, which will occur if it (that is, the meta-data generator 25) has not selected all of the Web site identifiers in the list, it will return to step 105 to select the next Web site identifier on the list, and generate tuples therefor in step 106.

The meta-data generator 25 will perform steps 105 through 107 in connection with each of the Web site identifiers in the list associated with the Web page selected in step 100. Eventually, the meta-data generator 25 will have performed steps 105 through 107 in connection with all of the Web site identifiers on the list, and at that point, in step 107, will make a negative determination, that is, it will determine that it has selected all of the Web site identifiers on the list. At that point, the meta-data generator 25 will return to step 103 to determine whether the Web archive 23 has any additional pages to be processed, and, if so, return to step 100 to select the next Web page.

Meta-data generator 25 will performs steps 100 through 107 in connection with each of the Web pages in the Web archive 23, to generate tuples for each of the Web site identifiers, for each Web page on which the textual items associated with the Web site identifiers are not in alphabetical order (reference step 102). After the meta-data generator 25 has processed all of the Web pages in the Web archive 23, it will make a negative determination in step 103, after which it will perform a number of steps to attempt to identify, for each Web site 12($m$), Web sites which are related to the respective Web site. Briefly, the meta-data generator 25 effectively performs these operations by selecting, for each Web site identified by the first Web site identifier in the various tuples, the ones of the Web sites associated with the second Web site identifiers which appear most often in the various tuples. In those operations, initially, the meta-data generator 25 sorts the tuples that were generated, using the first Web site identifier "12($m_{iS}$)" as a first sort key and the second Web site identifier "12($m'_{iS}$)" as the second sort key (step 108). The result is a sorted list in which tuples having the same first Web site identifier are aggregated together, and within each such aggregation, tuples with the same second Web site identifier are also aggregated together. Thereafter, the meta-data generator 25 counts, for each Web site identified by the first Web site identifier, the number of tuples which have the same second Web site identifier 12($m'_{iS}$) (step 109). The meta-data generator 25 then, for each Web site identified by the first Web site identifier in the respective tuples, ranks the Web sites identified by the second Web site identifiers in the tuples according to their respective counts (step 110) and selects a number of the Web site identifiers with the highest counts (step 111), which selected Web site identifiers will correspond to meta-data for the Web site identified by the tuples' first Web site identifier and can be stored in the meta-data store 24 (step 112).

It will be appreciated that the meta-data generator 25 can in step 111 select web identifiers using any of a number of diverse criteria, including selecting a predetermined maximum number of Web site identifiers, selecting all Web site identifiers other than those which are associated with fewer than a have a predetermined minimum number of counts, and the like. In addition, for example, the predetermined maximum number of Web site identifier criterion is used in selecting Web site identifiers, the meta-data generator 25 can also require that the Web site identifier which may be selected be identified as the second Web site identifier in a predetermined minimum number of tuples. The latter can help minimize the likelihood, for a particular Web site, a Web site identifier will be used in the meta-data for that Web site if it (that is, the Web site identifier) is only mentioned in a few tuples, which, in turn, can suggest a relatively tenuous, if any, relationship between the Web sites, even if within the predetermined maximum number mentioned above in connection with step 110. In any case, after the meta-data generator 25 has stored the meta-data in the meta-data store 24, it will be available to the interface 22 for use in responding to meta-data requests from the respective computers 11(n).

The meta-data generator 25 can obtain Web page sequences for use in connection with the usage analysis methodology described above in connection with FIG. 2 using a number of methodologies, which will be apparent to those skilled in the art.

Figure 3A:
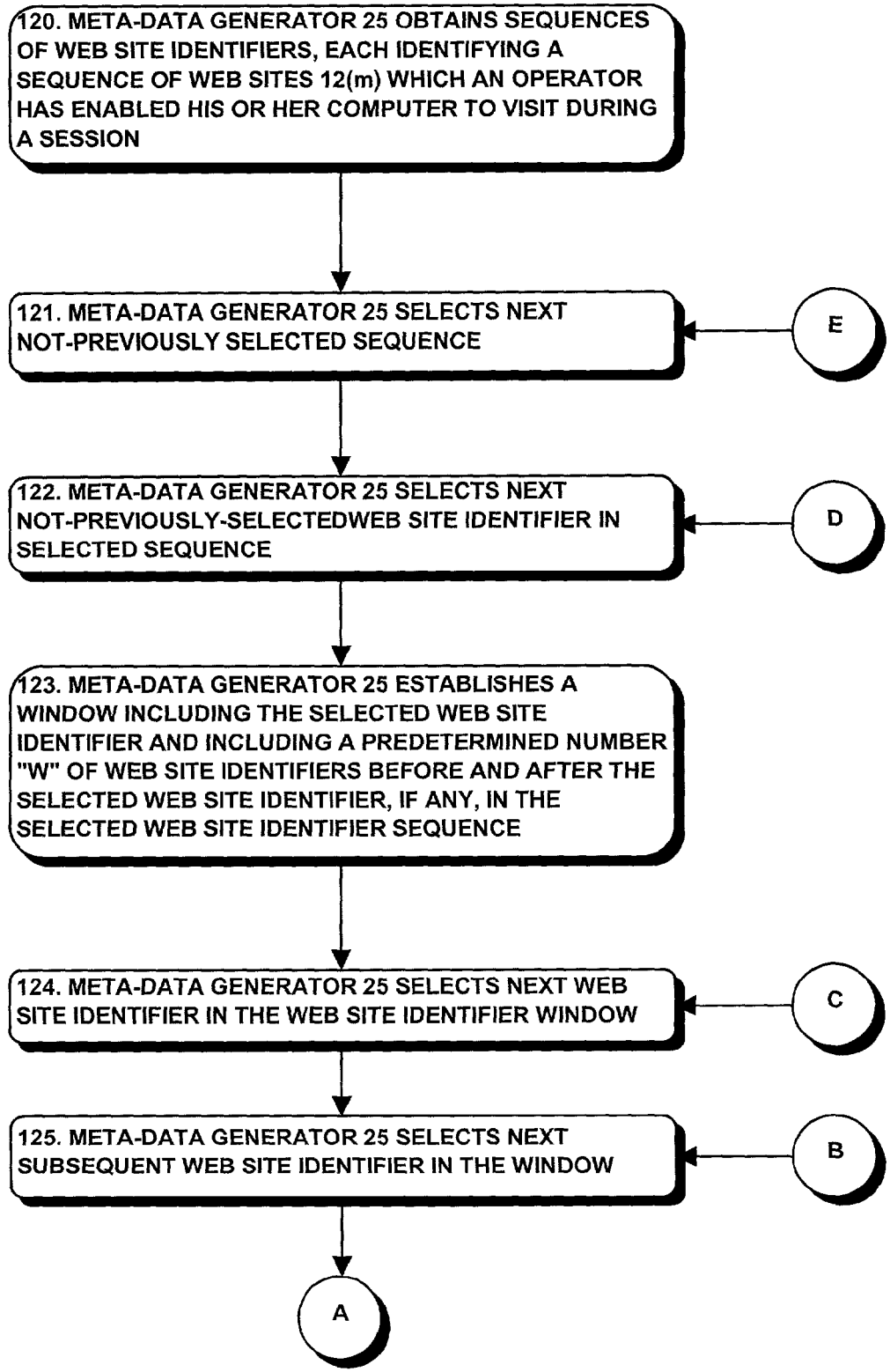
Figure 3B:
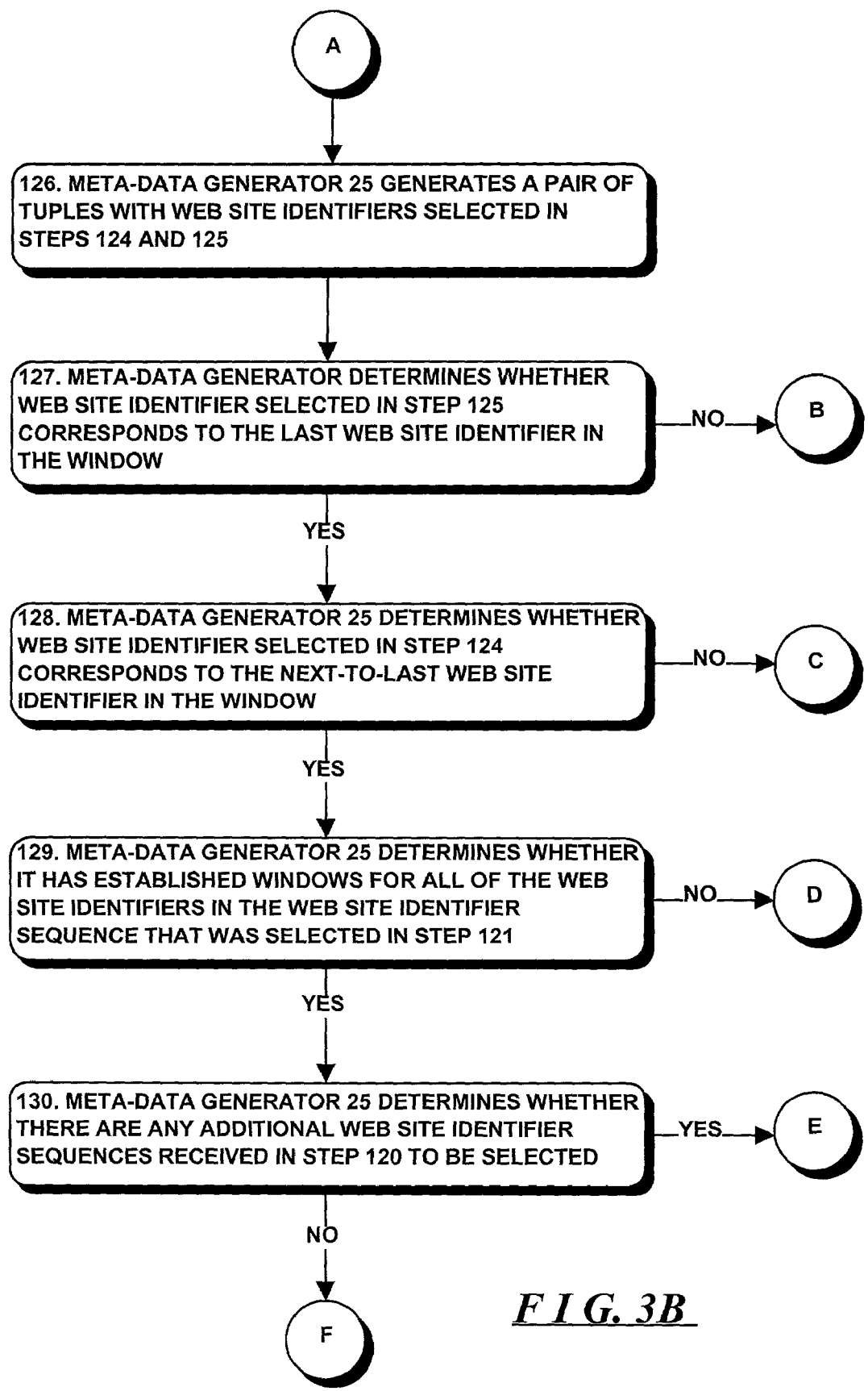
Figure 3C:
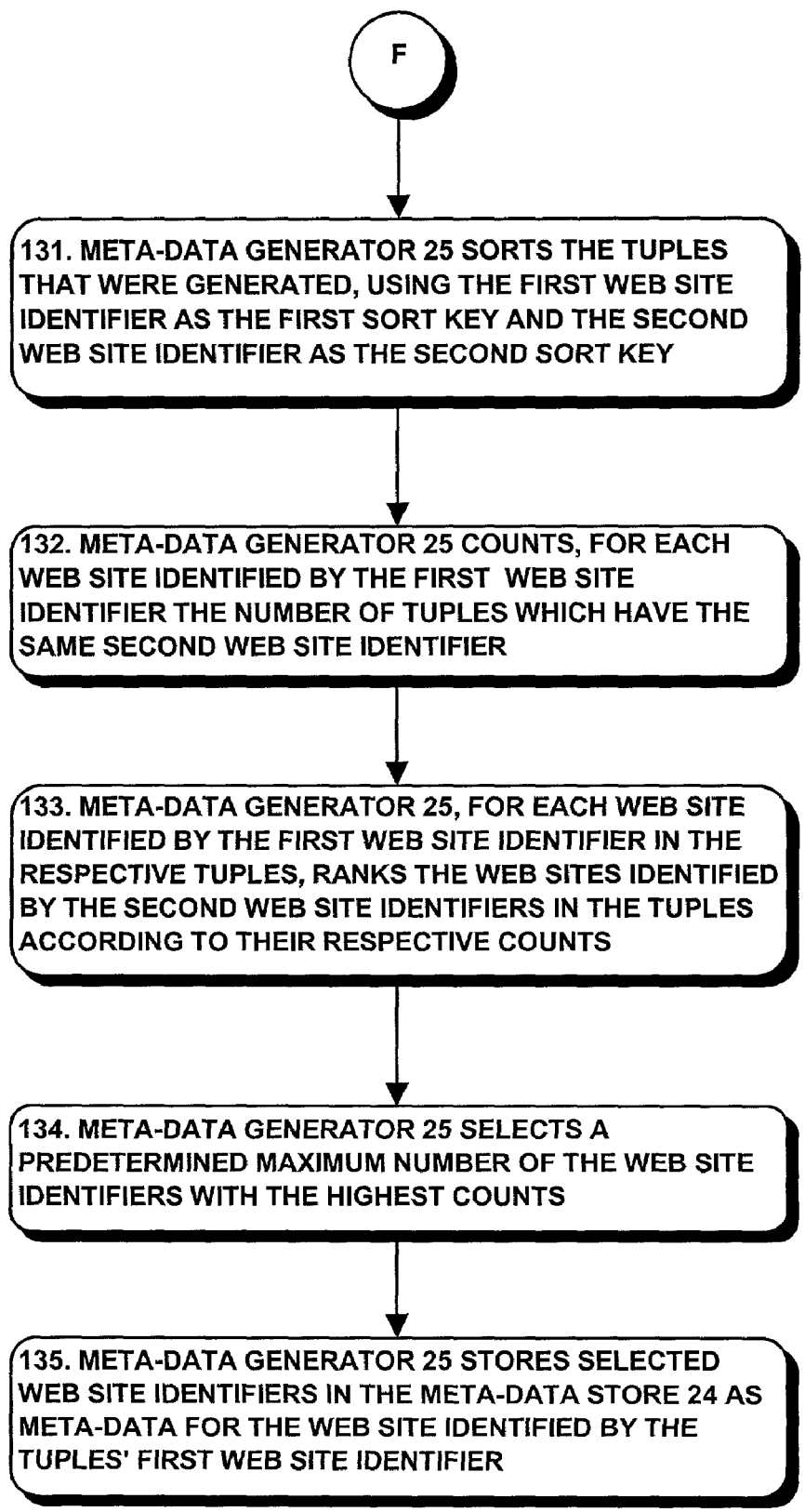
Figure 4A:
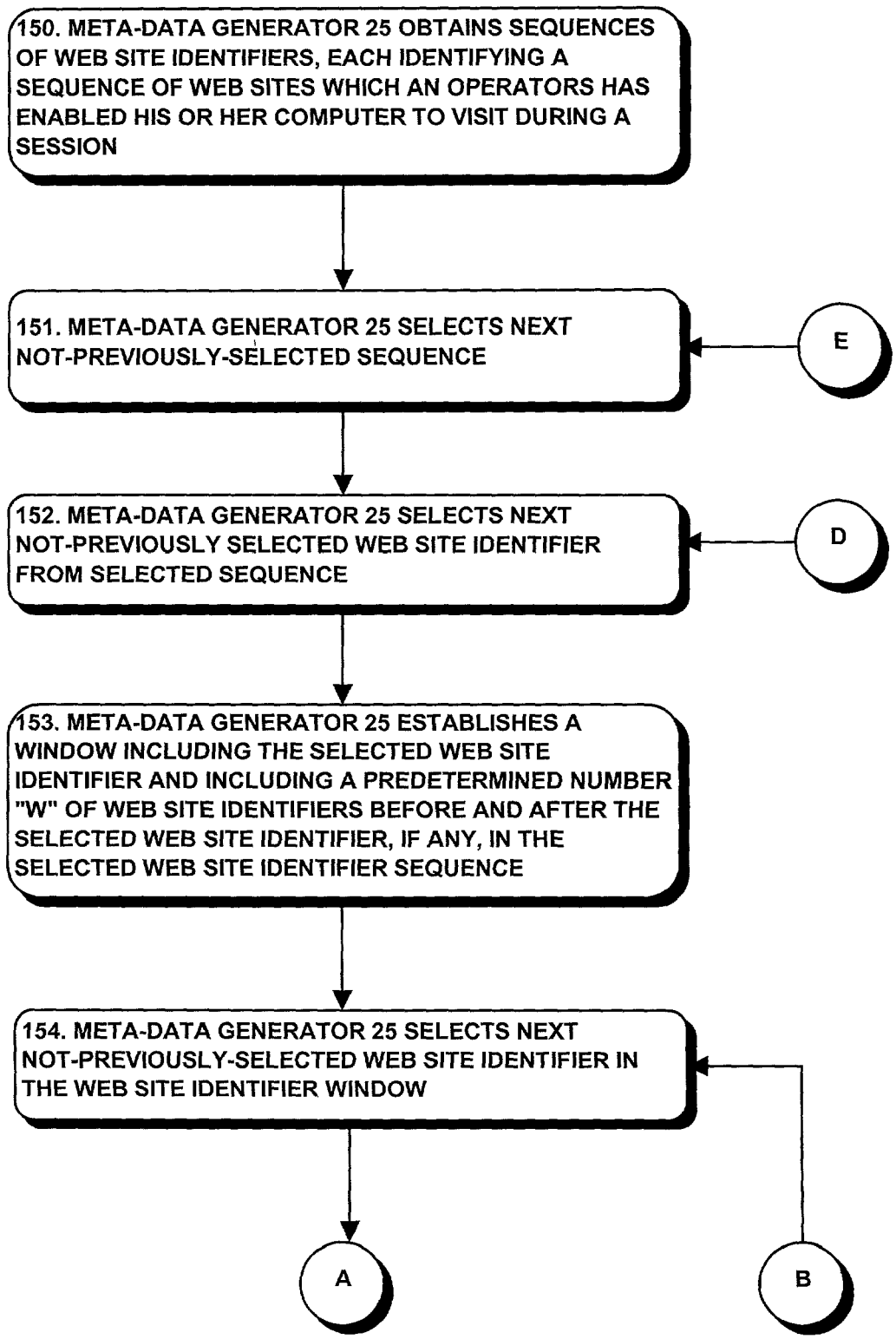
Figure 4B:
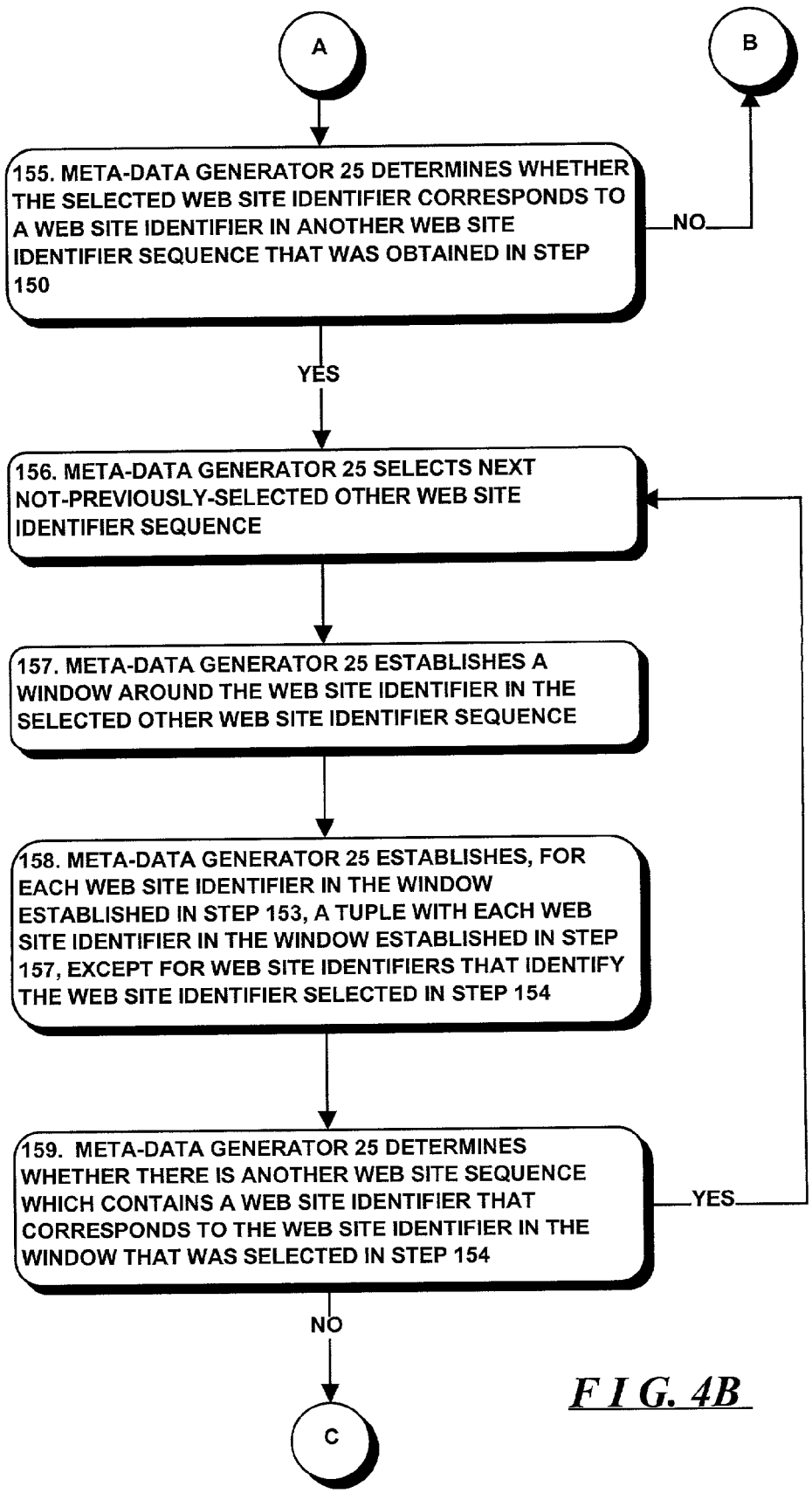
Figure 4C:
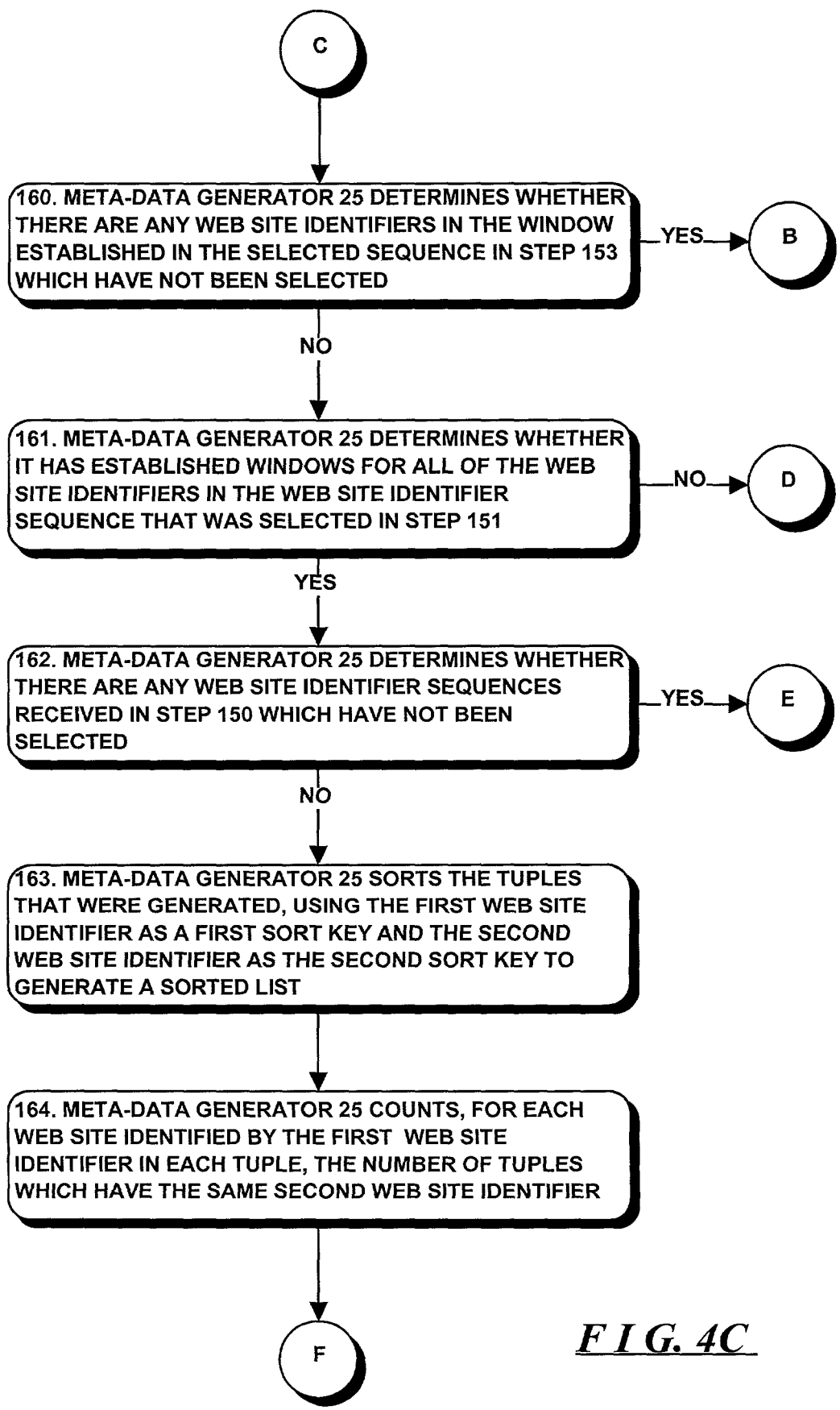
Figure 4D:
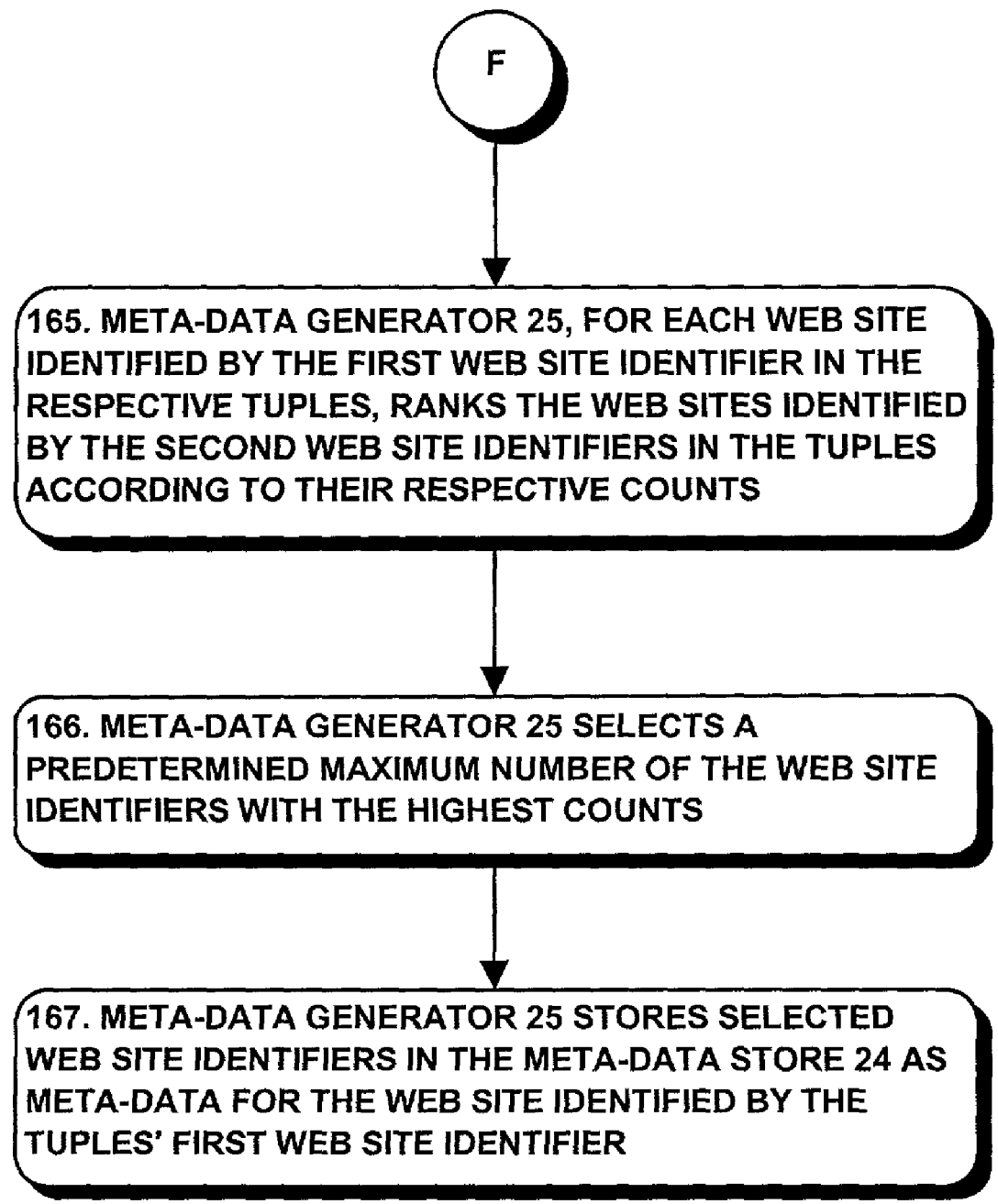

With reference to FIGS. 3 and 4, those FIGS. depict operations performed by the meta-data generator 25 in connection with two Web page usage analysis methodologies used by the meta-data generator 25. In both methodologies, the meta-data generator 25 determines relatedness among Web sites from the set of Web sites $12(m')$, $12(m'')$, . . . that operators visit during sessions during which they, through their computers 11(n), request Web pages to be downloaded thereto over the Internet 14. If sufficient numbers of such operators visit a similar set of Web sites during a session, or portion of a session, the meta-data generator 25 determines that those Web sites are likely to be related. Briefly, the meta-data generator 25, for a series of Web sites $12(m_1)$, $12(m_2)$, . . . , $12(m_V)$ (generally identified by reference numeral $12(m_v)$) that are "visited" by a computer 11(n) during a session, determines for each Web site $12(m_v)$ in the series a windowed set of Web sites $12(m_{v-w})$, . . . , $12(m_v)$, . . . , $12(m_{v+w})$ in a window "w" (w≧0) generally centered on the respective Web site $12(m_v)$. A Web site $12(m)$ is "visited" if the computer 11(n) requests retrieval of a Web page therefrom. It will be appreciated that, for v=1, . . . , w (that is, for Web sites $12(m_1)$ through $12(m_w)$) and v=V−w, . . . V (that is, for Web sites $12(m_{V-w})$ through $12(m_V)$) that are visited during a session, the windows will not be symmetric.

As noted above, in connection with the Web page usage analysis methodology, the meta-data generator 25 determines relatedness among Web sites from the set of Web sites $12(m')$, $12(m'')$, . . . that operators visit during sessions during which they, through their computers 11(n), request Web pages to be downloaded thereto over the Internet 14. If sufficient numbers of such operators visit a similar set of Web sites during a session, or portion of a session, the meta-data generator 25 determines that those Web sites are likely to be related. Briefly, the meta-data generator 25, for a series of Web sites $12(m_1)$, $12(m_2)$, . . . , $12(m_V)$ (generally identified by reference numeral $12(m_v)$) that are "visited" by a computer 11(n) during a session, determines for each Web site $12(m_v)$ in the series a windowed set of Web sites $12(m_{v-w})$, . . . , $12(m_v)$, . . . , $12(m_{v+w})$ in a window "w" (w≧0) generally centered on the respective Web site $12(m_v)$. A Web site $12(m)$ is "visited" if the computer 11(n) requests retrieval of a Web page therefrom. It will be appreciated that, for v=1, . . . , w (that is, for Web sites $12(m_1)$ through $12(m_w)$) and v=V−w, . . . V (that is, for Web sites $12(m_{V-w})$ through $12(m_V)$) that are visited during a session, the windows will not be symmetric.

In one Web page usage analysis methodology, described in connection with FIG. 3, for each such windowed set, for each Web site identifier in the windowed set, the meta-data generator 25 generates a pair of tuples with each of the other Web site identifiers. Thus, if, for example, an operator visited Web sites $12(m_{v-w})$, . . . , $12(m_v)$, . . . , $12(m_{v+w})$ during a session, the meta-data generator 25 establishes a set of tuples $[12(m_{v-w}), 12(m_{v-w+1})]$, $[12(m_{v-w+1}), 12(m_{v-w})]$, $[12(m_{v-w}), 12(m_{v-w+2})]$, $[12(m_{v-w+2}), 12(m_{v-w})]$, . . . , $[12(m_{v-w}), 12(m_{v+w})]$, $[12(m_{v+w}), 12(m_{v-w})]$, . . . , $[12(m_{v-w+1}), 12(m_{v-w+2})]$, $[12(m_{v-w+2}), 12(m_{v-w+1})]$, . . . , $[12(m_{v+w-1}), 12(m_{v+w})]$, $[12(m_{v+w}), 12(m_{v+w-1})]$ of all possible combinations of Web site identifiers for the Web sites visited during the session. After the meta-data generator 25 has generated sets of tuples, it sorts the tuples using the first Web site identifier as the primary sort key, and the second Web site identifier as the secondary sort key, to obtain a sorted list. For each of the first Web site identifiers in the respective tuples, the meta-data generator 25 identifies those Web sites for which the second identifier is mentioned most frequently, and selects a predetermined number of such Web sites. Those selected Web sites comprise the set of related Web sites for the respective Web site whose identifier is the first Web site identifier in the tuple. Preferably, for a Web site, each of the other Web sites deemed "related" thereto will be identified as the second Web site identifier in a predetermined minimum number of tuples for which the particular Web site is identified as the first Web site identifier.

With this background, and with reference to FIG. 3, the meta-data generator 25 initially obtains sequences of Web site identifiers, each Web site identifier sequence identifying a sequence of Web sites $12(m)$ which an operator has enabled his or her computer to visit during a session (step 120). Web site visitation sequences can be obtained using a variety of methodologies. In one methodology, the meta-data server 13 can determine a Web site visitation sequence for a session from the sequence of requests obtained from a computer 11(n) for meta-data for respective Web sites during the session. After obtaining a Web site identifier sequence in step 120, the meta-data generator 25 thereafter performs a number of steps to generate tuples of Web site identifiers. In that operation, the meta-data generator selects one of the sequences (step 121) and, in each of a plurality of iterations, selects a Web site identifier (step 122) and establishes a window including the selected Web site identifier and including a predetermined number "w" of Web site identifiers before and after the selected Web site identifier, if any, in the selected Web site identifier sequence (step 123). It will be appreciated that, in the first iteration, the meta-data generator 25 will select the first Web site identifier in the Web site identifier sequence that was selected in step 121, and in each subsequent iteration it will select each subsequent Web site identifier in the Web site identifier sequence.

After establishing the Web site identifier window in the selected sequence in step 123, the meta-data generator 25, in each of a series of iterations, selects one of the Web site identifiers in the Web site identifier window, which Web site identifier will be referred to as "$12(m_x)$" (step 124). It will be appreciated that, in the first iteration, the meta-data generator 25 will select the first Web site identifier "$12(m_{v-w})$" in the window as Web site identifier "$12(m_x)$," and in each subsequent iteration, it (that is, the meta-data generator 25) will select each subsequent Web site identifier "$12(m_{v-w+1})$", . . . , "$12(m_{v+w})$" in the window as Web site identifier $12(m_x)$.) Thereafter, the meta-data generator 25 will, in a series of iterations, select in sequence one of the subsequent Web site identifiers "$12(m_{x+1})$", "$12(m_{x+2})$," . . . , "$12(m_{v+w})$" in the window established in step 123 as a Web site identifier "$12(m_y)$" (step 125) and generate a pair of tuples $[12(m_x), 12(m_y)]$ and $[12(m_y), 12(m_x)]$ (step 126). After establishing the set of tuples for the Web site identifier "$12(m_y)$" selected in step 125, the meta-data generator 25 determines whether Web site identifier "$12(m_y)$" corresponds to the last Web site identifier "$12(m_{y+w})$" in the window (step 127). If the meta-data generator 25 makes a negative determination in step 127, it will return to step 125 to select the next Web site identifier "$12(m_{y+1})$" in the window.

The meta-data generator 25 performs steps 125 through 127 through one or more iterations until it determines in step 127 that Web site identifier "$12(m_y)$" corresponds to the last Web site identifier "$12(m_{v+w})$" in the window. At that point, it will have generated sets of tuples for the Web site identifier "$12(m_x)$" selected in step 124, with all of the subsequent Web site identifiers in the window. In that case, the meta-data generator 25 will make a positive determination in step 127 and sequence to step 128. In that step 128, the meta-data generator 25 will determine whether the Web site identifier "$12(m_x)$" selected in step 124 corresponds to the previous Web site identifier "$12(m_{v+w-1})$," if any, in the window. If the meta-data generator 25 makes a negative determination in step 128, it will not have generated sets of tuples for all combinations of Web site identifiers in the window established in step 123, and so it will return to step 124 to select the next Web site identifier "$12(m_{x+1})$" and perform steps 125 through 128 in connection with that Web site identifier. The meta-data generator 25 will perform steps 124 through 128 in connection with each of the Web site identifiers "$12(m_{v-w})$" through "$12(m_{v+w-1})$" in the window established in step 123. After it has done so, it will have generated sets of tuples for all of the possible combinations of Web site identifiers in the window. At that point, the meta-data generator 25 will make a positive determination in step 128 and thereafter determine whether it has established windows for all of the Web site identifiers in the Web site identifier sequence that was selected in step 121 (step 129). If the meta-data generator 25 makes a negative determination in step 129, which will occur if it has selected each of the Web site identifiers in the Web site identifier sequence selected in step 121 and performed the above-described operations in connection with all of the Web site identifiers in that Web site identifier sequence, it will return to step 122 to select the next Web site identifier in the sequence.

Meta-data generator 25 will perform steps 122 through 129 through a series of iterations until it determines, in step 129, that it has selected each of the Web site identifiers in the Web site identifier sequence selected in step 121. At that point, it can determine whether there are any additional Web site identifier sequences received in step 120 to be processed (step 130). If the meta-data generator 25 makes a positive determination in step 130, it will return to step 121 to select the next Web site identifier sequence and perform operations described above in connection with steps 122 through 130 in connection therewith.

On the other hand, if the meta-data generator 25 makes a negative determination in connection with step 130, it will have processed all of the Web site identifier sequences that were received in step 150. At that point, it will be appreciated that the tuples that were generated in step 126 in each of the iterations will identify, for each Web site, associated with the first Web site identifier "$12(m_v)$" in each tuple, the other Web sites, identified by the second web site identifier "$12(m'_v)$" in the respective tuple, that were visited proximate the point in time in each session, as determined by the size of the respective window. Thereafter, the meta-data generator 25 performs a number of steps to attempt to identify, for each Web site $12(m)$, Web sites which are related to the respective Web site, by effectively selecting, for each Web site identified by the first Web site identifier "$12(m_v)$" in the various tuples, the ones of the Web sites associated with the second Web site identifiers "$12(m'_v)$" which appear most often in the various tuples. In that operation, initially, the meta-data generator sorts the tuples that were generated, using the first Web site identifier "$12(m_v)$" as a first sort key and the second Web site identifier "$12(m'_v)$" as the second sort key (step 131). The result is a sorted list in which tuples having the same first Web site identifier "$12(m_v)$" are aggregated together, and within each such aggregation, tuples with the same second Web site identifier "$12(m'_v)$" are also aggregated together. Thereafter, the meta-data generator 25 can count, for each Web site identified by the first Web site identifier "$12(m_v)$," the number of tuples which have the same second Web site identifier $12(m'_v)$ (step 132). The meta-data generator 25 then, for each Web site identified by the first Web site identifier in the respective tuples, ranks the Web sites identified by the second Web site identifiers in the tuples according to their respective counts (step 133) and selects a predetermined maximum number of the Web site identifiers with the highest counts (step 134), which selected Web site identifiers will correspond to meta-data for the Web site identified by the tuples' first Web site identifier and can be stored in the meta-data store 24 (step 135).

It will be appreciated that in connection with selecting Web site identifiers in step 134, the meta-data generator 25 can require that the Web site identifier which may be selected be identified as the second Web site identifier in a predetermined minimum number of tuples. This can help minimize the likelihood, for a particular Web site, a Web site identifier will be used in the meta-data for that Web site if it (that is, the Web site identifier) is only mentioned in a few tuples, which, in turn, can suggest a relatively tenuous relationship between the Web sites, even if within the predetermined maximum number mentioned above in connection with step 134.

In another Web page usage analysis methodology, described in connection with FIG. 4, for each such windowed set, for each Web site identified in the respective windowed set, the meta-data generator 25 determines whether any of the Web sites are also visited during another session, either by the same computer or by another computer. If so, the meta-data generator 25 establishes tuples between each Web site in the respective window for each session. Thus, if, for example, in the other session, the Web site $12(m_{v-w+x})$ (where Web site $12(m_{v-w+x})$ is one of Web sites $12(m_{v-w})$, . . . , $12(m_v)$, . . . , $12(m_{v+w})$) was visited in a similar window $12(m'_{v-w})$, . . . , $12(m'_v)$, . . . , $12(m'_{v+w})$ during another session, where Web site $12(m_{v-w+x})$ can be any one of the Web sites in the other window, then the meta-data generator 25 establishes a set of tuples [$12(m_{v-w})$, $12(m'_{v-w})$], [$12(m_{v-w})$, $12(m'_{v-w+1})$], . . . , [$12(m_{v-w})$, $12(m'_{v+w})$], [$12(m_{v-w+1})$, $12(m'_{v-w})$], . . . , [$12(m_{v+w})$, $12(m'_{v+w})$]. The meta-data generator 25 will generate tuples for each window in the series of Web sites visited during the other session which includes Web site $12(m_{v-w+x})$ visited during the first session, so that there can be up to 2w+1 sets of tuples, one for each of the windows associated with the other session that includes Web site $12(m_{v-w+x})$. In addition, the Web site can be identified in as many as 2w+1 windows. The meta-data generator 25 establishes such tuples for each Web site which was visited in windows in a respective pairs of sessions.

After the meta-data generator 25 has generated sets of tuples, it sorts the tuples using the first Web site identifier as the primary sort key, and the second Web site identifier as the secondary sort key, to obtain a sorted list. For each of the first Web site identifiers in the respective tuples, the meta-data generator 25 identifies those Web sites for which the second identifier is mentioned most frequently, and selects a predetermined number of such Web sites. Those selected Web sites comprise the set of related Web sites for the respective Web site whose identifier is the first Web site identifier in the tuple. Preferably, for a Web site, each of the other Web sites deemed "related" thereto will be identified as the second Web site identifier in a predetermined minimum number of tuples for which the particular Web site is identified as the first Web site identifier.

With this background, and with reference to FIG. 4, the meta-data generator 25 initially obtains sequences of Web site identifiers, each Web site identifier sequence identifying a sequence of Web sites 12(m) which an operators has enabled his or her computer to visit during a session (step 150). Web site visitation sequences can be obtained using a variety of methodologies. In one methodology, the meta-data server 13 can determine a Web site visitation sequence for a session from the sequence of requests obtained from a computer 11(n) for meta-data for respective Web sites during the session. After obtaining a Web site identifier sequence in step 150, the meta-data generator 25 thereafter performs a number of steps to generate tuples of Web site identifiers. In that operation, the meta-data generator selects one of the sequences (step 151) and, in each of a plurality of iterations, selects a Web site identifier (step 152) and establishes a window including the selected Web site identifier and including a predetermined number "w" of Web site identifiers before and after the selected Web site identifier, if any, in the selected Web site identifier sequence (step 153). It will be appreciated that, in the first iteration, the meta-data generator 25 will select the first Web site identifier in the Web site identifier sequence that was selected in step 151, and in each subsequent iteration it will select each subsequent Web site identifier in the Web site identifier sequence.

After establishing the Web site identifier window in the selected sequence in step 153, the meta-data generator 25, in each of a series of iterations, selects one of the Web site identifiers in the Web site identifier window (step 154) and determines whether the selected Web site identifier corresponds to a Web site identifier in another Web site identifier sequence that was obtained in step 150 (step 155). It will be appreciated that, in the first iteration, the meta-data generator 25 will select the first Web site identifier "12($m_v$)" in the window, and in each subsequent iteration, it (that is, the meta-data generator 25) will select each subsequent Web site identifier in the window. If the meta-data generator 25 makes a positive determination in step 155, that is, if it determines that the selected Web site identifier corresponds to a Web site identifier in another Web site identifier sequence, it will select one such other Web site identifier sequence (step 156), establish a window around the Web site identifier in the selected other Web site identifier sequence (step 157) and establish, for each Web site identifier in the window established in step 153, a tuple [12($m_v$), 12($m'_v$)] with each Web site identifier "12($m'_v$)" in the window established in step 157, except for Web site identifiers that identify the same Web site 12(m) (step 158). In each Web site identifier tuple [12($m_v$), 12($m'_v$)], the first Web site identifier "12($m_v$)" corresponds to the Web site identifier selected in step 155, and the second Web site identifier "12($m'_v$)" corresponds to a Web site identifier in the window established in step 157. After establishing the set of tuples, the meta-data generator 25 determines whether there is another Web site sequence which contains a Web site identifier that corresponds to the Web site identifier in the window that was selected in step 154 (step 159), and if so, returns to step 156 to select another such Web site sequence.

The meta-data generator 25 performs steps 156 through 158 through one or more iterations, until it determines in step 159 that it has performed those operations for each of the other Web site sequences which contain a Web site identifier that corresponds to the Web site identifier that was selected in step 154. Thereafter the meta-data generator 25 determines whether there are any additional Web site identifiers in the window established in the selected sequence in step 153 (step 160). If the meta-data generator 25 makes a positive determination in step 160, it returns to step 154 to select the next Web site identifier in the window established in step 153 and repeat the operations described above in connection with steps 155 through 159 in connection with that Web site identifier. Thus, meta-data generator 25 performs steps 154 through 160 in connection with each of the Web site identifiers in the window established in step 153, thereby to generate Web site identifier tuples for each of the Web site identifiers in the window established in step 153. It will be appreciated that the tuples generated in step 158 identify, for each Web site identifier identified in the window, other Web sites that other operators have visited during a portion of a session, as determined by the sizes of the respective windows.

Returning to step 160, if the meta-data generator 25 makes a negative determination in that step, which will occur after it has selected all of the Web site identifiers in the window established in step 153, it will determine whether it has established windows for all of the Web site identifiers in the Web site identifier sequence that was selected in step 151 (step 161). If the meta-data generator 25 makes a negative determination in step 161, which will occur if it has selected each of the Web site identifiers in the Web site identifier sequence selected in step 151 and performed the above-described operations in connection with all of the Web site identifiers in that Web site identifier sequence, it will return to step 152 to select the next Web site identifier in the sequence.

Meta-data generator 25 will perform steps 152 through 161 through a series of iterations until it determines, in step 161, that it has selected each of the Web site identifiers in the Web site identifier sequence selected in step 151. At that point, it can determine whether there are any additional Web site identifier sequences received in step 150 to be processed (step 162). If the meta-data generator 25 makes a positive determination in step 162, it will return to step 151 to select the next Web site identifier sequence and perform operations described above in connection with steps 152 through 162 in connection therewith.

On the other hand, if the meta-data generator 25 makes a negative determination in connection with step 162, it will have processed all of the Web site identifier sequences that were received in step 150. At that point, it will be appreciated that the tuples that were generated in step 157 in each of the iterations will identify, for each Web site, associated with the first Web site identifier "12($m_v$)" in each tuple, the other Web sites, identified by the second web site identifier "12($m'_v$)" in the respective tuple, that were visited during respective sessions proximate the point in time in each session at which the other Web sites were visited, as determined by the sizes of the respective windows. Thereafter, the meta-data generator 25 performs a number of steps to attempt to identify, for each Web site 12(m), Web sites which are related to the respective Web site, by effectively selecting, for each Web site identified by the first Web site identifier "12($m_v$)" in the various tuples, the ones of the Web sites associated with the second Web site identifiers "12($m'_v$)" which appear most often in the various tuples. In that operation, initially, the meta-data generator sorts the tuples that were generated, using the first Web site identifier "$12(m_v)$" as a first sort key and the second Web site identifier "$12(m'_v)$" as the second sort key (step 163). The result is a sorted list in which tuples having the same first Web site identifier "$12(m_v)$" are aggregated together, and within each such aggregation, tuples with the same second Web site identifier "$12(m'_v)$ are also aggregated together. Thereafter, the meta-data generator 25 can count, for each Web site identified by the first Web site identifier "$12(m_v)$," the number of tuples which have the same second Web site identifier $12(m'_v)$ (step 164). The meta-data generator 25 then, for each Web site identified by the first Web site identifier in the respective tuples, ranks the Web sites identified by the second Web site identifiers in the tuples according to their respective counts (step 165) and selects a predetermined maximum number of the Web site identifiers with the highest counts (step 166), which selected Web site identifiers will correspond to meta-data for the Web site identified by the tuples' first Web site identifier and can be stored in the meta-data store 24 (step 167).

It will be appreciated that in connection with selecting Web site identifiers in step 166, the meta-data generator 25 can require that the Web site identifier which may be selected be identified as the second Web site identifier in a predetermined minimum number of tuples. This can help minimize the likelihood, for a particular Web site, a Web site identifier will be used in the meta-data for that Web site if it (that is, the Web site identifier) is only mentioned in a few tuples, which, in turn, can suggest a relatively tenuous relationship between the Web sites, even if within the predetermined maximum number mentioned above in connection with step 166.

Figure 5:
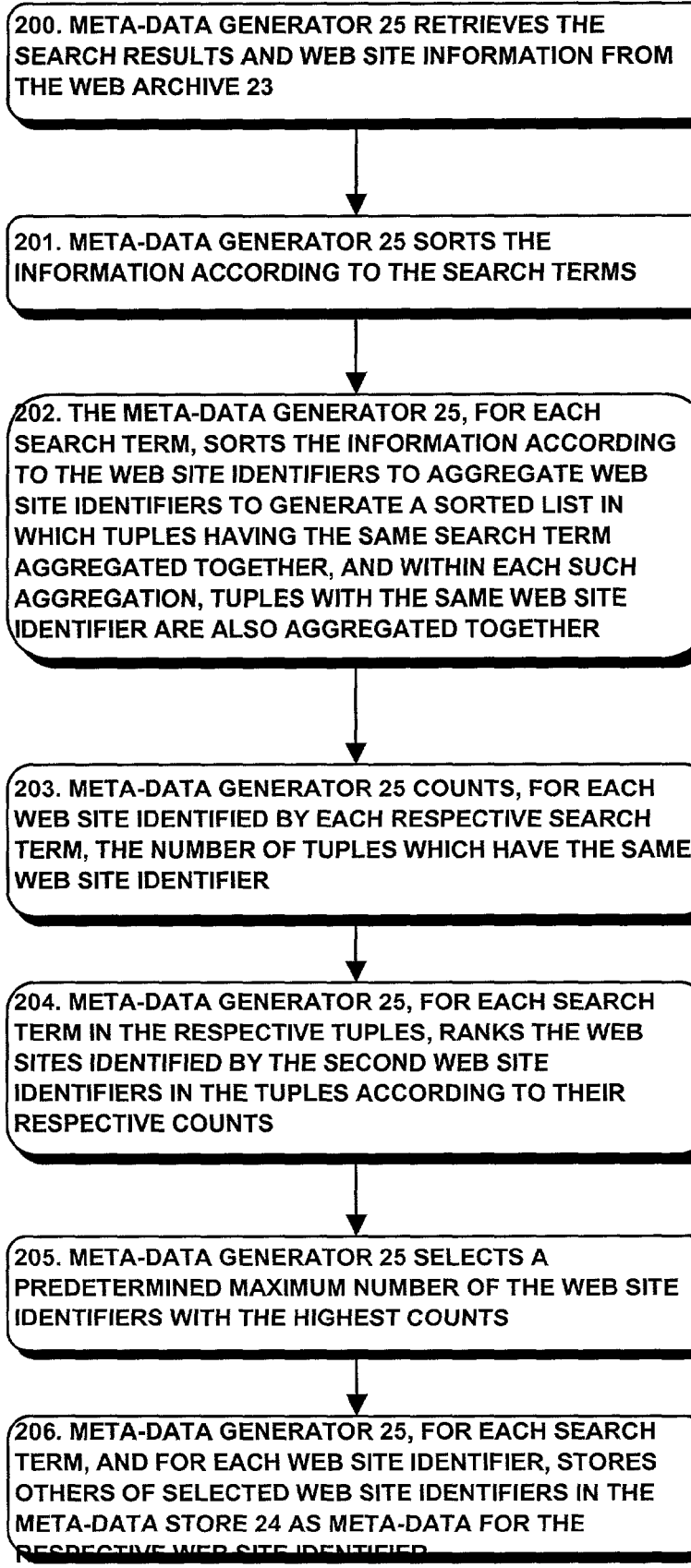

With reference to FIG. 5, that FIG. depicts operations performed by the meta-data generator 25 in connection with the search results analysis methodology. As noted above, in the search results analysis methodology, the meta-data generator 25 makes use of an indication that, after a sufficient number of computers $11(n)$, under control of their operators, after receiving a search result from a search engine in response to a search request related to a specific search topic, sequences to a Web site $12(m)$ which has a Web page that is identified in the search results, remains at that Web site for a while. The meta-data generator 25 can use a number of methodologies to determine that a computer $11(n)$ has been at a Web site $12(m)$ for a sufficient amount of time by, for example, determining that the computer $11(n)$ has requested a predetermined minimum number of Web pages from the Web site $12(m)$, that the computer $11(n)$ has remained at the Web site for a predetermined minimum time interval before requesting a Web page from another Web site, or other methodologies which will be apparent to those skilled in the art. The meta-data generator 25 can receive the search results and Web site information and store it in the Web archive 23 for analysis.

More specifically, and with reference to FIG. 5, in connection with the search results analysis methodology, the meta-data generator 25 will initially retrieve the search results and Web site information from the Web archive 23 (step 200) and, if not already organized according to the search terms used to obtain the search results, sort the information according to the search terms (step 201). Thereafter, for each search term, the meta-data generator 25 can sort the information according to the Web site identifiers to aggregate Web site identifiers (step 202). It will be appreciated that the search results and Web site information may be in the form of tuples similar to those described above in connection with FIGS. 2 and 3, with each tuple including a search term and an associated Web site identifier. In that case, steps 201 and 202 can be performed by sorting the tuples using first the search term portion of the respective tuples as a first sort key, and thereafter the Web site identifier as a second sort key.

The result of steps 201 and 202 is a sorted list in which tuples having the same search term aggregated together, and within each such aggregation, tuples with the same Web site identifier are also aggregated together. Thereafter, the meta-data generator 25 counts, for each Web site identified by each respective search term, the number of tuples which have the same Web site identifier (step 203). The meta-data generator 25 then, for each search term in the respective tuples, ranks the Web sites identified by the second Web site identifiers in the tuples according to their respective counts (step 204) and selects a predetermined maximum number of the Web site identifiers with the highest counts (step 205). The selected Web site identifiers will correspond to meta-data for each of the Web sites among those Web sites that are selected, and so, for each Web site identifier, the Web site identifiers for the other Web sites among those selected, can be stored as meta-data in the meta-data store 24 (step 206).

It will be appreciated that in connection with generating meta-data for Web sites associated with a particular search term in step 204, the meta-data generator can require that a Web site identifier which may be selected be identified as the Web site identifier in a predetermined minimum number of tuples. This can help minimize the likelihood, for a particular Web site, a Web site identifier will be used in the meta-data for that Web site if it (that is, the Web site identifier) is only mentioned in a few tuples, which, in turn, can suggest a relatively tenuous, if any, relationship between the Web sites, even if within the predetermined maximum number mentioned above in connection with step 204. In any case, after the meta-data generator 25 has stored the meta-data in the meta-data store 24, it will be available to the interface 22 for use in responding to meta-data requests from the respective computers $11(n)$.

As noted above, the meta-data generator 25 may generate meta-data using any one or more of the methodologies described above. If the meta-data generator 25 uses more than one of the methodologies, it can combine meta-data that it generates using the various methodologies. In combining the meta-data, the meta-data generator can make use of all meta-data for a Web site that it generates using the various methodologies. Alternatively, it can combine meta-data for a Web site based, for example, on the number of times other Web site identifiers appear in tuples generated using the various methodologies. For example, if, for a Web site, two Web site identifiers are selected as meta-data using different methodologies, but, for example, (i) one of them appears in a higher percentage of tuples in the methodology in which it was selected than the other, or (ii) after the respective Web sites are ranked (reference steps 110 and 165 above), one of them is closer to the cut-off point for being selected using one methodology than the other is to being selected using the other methodology, the meta-data generator 25 may select the one and not the other for use in the combined meta-data. Other methods for combining meta-data generated using various methodologies will be apparent to those skilled in the art.

The invention provides a number of advantages. In particular, the invention provides a meta-data generator 25 for automatically generating meta-data for Web sites, which a computer $11(n)$, in particular a meta-data client 21, can request contemporaneous with a request by the browser 20 associated therewith for a Web page from the Web site 12(*m*).

It will be appreciated that numerous modifications may be made to the meta-data generator 25 as described herein. Generally, as noted above, the meta-data generated by the meta-data generator 25 identifies the Web site by specifying the Web site's top level web page. Typically, a web page can be identified by a number of forms of Web page identifiers and the meta-data generator 25 will at some point in the meta-data generation operation canonicalize the Web site identifiers which it uses. Essentially, in canonicalization the meta-data generator 25 identifies, for each Web site identifier, one Web page identifier for the top level page of the Web site which maintains the Web page identified by the Web page identifier, with the same Web page identifier for the top level page being used for all of the Web page identifiers for a Web site. The meta-data generator 25 may make use of a number of canonicalization methodologies to determine the canonicalized Web site identifier for a Web site 12(*m*), including, for example, identifying from a number of different links, a uniform identifier for the Web site, which may include the Internet domain identifier and other elements. In that operation, the meta-data generator 25 may enable the interface 22 to retrieve Web pages using various proposed canonicalizations for the Web site identifier and determine whether the retrieved Web pages are identical or similar to a predetermined degree.

In addition, although the meta-data generator 25 has been described as generating, from a pair of web site identifiers "12($m_A$)" and "12($m_B$)" two tuples [12($m_A$), 12($m_B$)] and [12($m_B$), 12($m_A$)] in connection with the usage analysis methodology decided above in connection with FIG. 3, (reference step 126, FIG. 3B), it will be appreciated that the meta-data generator 25 can instead generate one of the tuple, either tuple [12($m_A$), 12($m_B$)] or tuple [12($m_B$), 12($m_A$)].

Furthermore, although the methodologies have been described as making use of Web site identifiers, or more particularly identifiers of top-level or other predetermined Web pages maintained by and available from the Web sites 12(*m*), it will be appreciated that other Web page identifiers can be used in addition or instead.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a computer-readable storage medium in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed is:

1. A computer-implemented system for identifying related network sites, the system comprising:

an information accumulation module configured to accumulate search activity data reflective of search activities of each of a plurality of search engine users, said search activity data identifying particular network sites selected by users from results of search requests;

a meta-data generation module configured to analyze at least the search activity data accumulated by the information accumulation module to generate meta-data reflective of search-activity-based relationships between particular network sites, said meta-data identifying particular network sites that are related to each other, wherein the meta-data generation module is configured to identify, for a first network site, a set of related network sites that, based at least in part on search activities of multiple users, are related to the first network site, and is configured to identify, for a particular search term submitted in a plurality of search requests, a set of network sites most frequently selected by users who submitted the search term; and a storage module configured to store the meta-data generated by the meta-data generation module.

2. The system of claim 1, wherein the meta-data generation module is configured to aggregate network site selection data by at least one common search term.

3. The system of claim 1, wherein the meta-data generation module takes into consideration amounts of time spent by particular users accessing particular network sites selected from search results.

4. The system of claim 1, wherein the search activity data accumulated by the information accumulation module identifies, for a particular search request submitted to a search engine by a particular user, at least one network site selected by the particular user from search results of said search request.

5. The system of claim 1, wherein the network sites are web sites.

6. The system of claim 1, further comprising a meta-data server that serves the meta-data stored by the storage module over a network in response to requests from clients.

7. The system of claim 6, further comprising a meta-data client that runs on a computer in conjunction with a web browser, wherein the meta-data client is configured to cause the computer to (a) retrieve, from the meta-data server, meta-data associated with a web page requested by the web browser, and (b) display the retrieved meta-data to enable an operator of the computer to identify network sites that are related to said web page.

8. The system of claim 7, wherein the meta-data client causes the requested meta-data to be displayed in a window that is separate from a browser window in which the web page is displayed.

9. The system of claim 1, further comprising a client component that is responsive to an operator-initiated access to a particular network site by retrieving and displaying the meta-data associated with the particular network site, to thereby enable the operator to identify one or more other network sites that are related to the particular network site.

10. The system of claim 1, further comprising a computer configured to retrieve and display the meta-data stored by the storage module to assist a user in locating network sites of interest.

11. A computer-implemented method of identifying related network sites, the method comprising:

accumulating search activity data reflective of search activities of each of a plurality of users, said search activity data identifying particular search terms used by said users in particular search requests, and identifying network sites selected by the users from search results of said search requests;

analyzing the accumulated search activity data of said plurality of users on an aggregated basis to identify search-activity-based associations between particular network sites, wherein the step of analyzing the accumulated search activity data comprises identifying, for a first network site, a set of related network sites that, based on search activities of multiple users, are related to the first network site, and further comprises identifying, for a selected search term, a plurality of network sites frequently selected by users who submitted the search term; and storing, in computer storage, data reflective of said search-activity-based associations between particular network sites.

12. The method of claim 11, wherein the step of analyzing the accumulated search activity data comprises aggregating network-site-selection events by common search term.

13. The method of claim 11, wherein the step of analyzing the accumulated search activity data comprises taking into consideration amounts of time spent by particular users accessing particular network sites selected from search results.

14. The method of claim 11, wherein the search activity data identifies, for a particular search request submitted to a search engine by a particular user, at least one network site selected by the particular user from search results of said search request.

15. The method of claim 11, wherein the data reflective of said search-activity-based associations identifies, for each of a plurality of network sites, a respective set of related network sites.

16. The method of claim 11, wherein the network sites are web sites.

* * * * *